United States Patent [19]
Van Brunt et al.

[11] Patent Number: 5,485,488
[45] Date of Patent: Jan. 16, 1996

[54] CIRCUIT AND METHOD FOR TWISTED PAIR CURRENT SOURCE DRIVER

[75] Inventors: Roger W. Van Brunt, San Francisco; Florin A. Oprescu, Sunnyvale, both of Calif.

[73] Assignee: Apple Computer, Inc., Cupertino, Calif.

[21] Appl. No.: 219,728

[22] Filed: Mar. 29, 1994

[51] Int. Cl.$^6$ ........................................... H04B 3/00
[52] U.S. Cl. ........................................... 375/257; 375/220
[58] Field of Search .................. 375/36, 7; 307/412; 326/82; 330/258; 370/27

[56] References Cited

U.S. PATENT DOCUMENTS

| | | | |
|---|---|---|---|
| 4,583,214 | 4/1986 | Miyashita et al. | 370/5 |
| 5,243,623 | 9/1993 | Murdock | 375/36 |

FOREIGN PATENT DOCUMENTS 21824 7/1982 United Kingdom .

OTHER PUBLICATIONS

Nippon Denki, Patent Abstracts of Japan, vol. 9, No. 219 (M–410)(1942) Sep. 6, 1985.
Sundstrom, R. et al., A Low Power Differential Bus Utilizing Novel Split Level Bus Technique Sep. 17–18, 1990, pp. 144–147.

*Primary Examiner*—Stephen Chin
*Assistant Examiner*—Kevin Kim
*Attorney, Agent, or Firm*—Blakely, Sokoloff, Taylor & Zafman

[57] ABSTRACT

A mechanism and method for efficiently communicating information regarding particular communication rate ("speed signal") between two or more communication stations (of a communication network). The transmitter operates on the IEEE P1394 High Performance Serial Bus to supply both differential and common mode signaling required by the IEEE standard for exemplary data transfer rates of 100 and 200 Mbit transmission. The present invention includes a transmission circuit that may operate in a differential signal mode and simultaneously in a common mode signal mode both utilizing a twisted pair cable. Data may be transmitted on the twisted pair at small differential signals. Information regarding the signal speed between two coupled units may be simultaneously transmitted using variations in the common mode voltage over the twisted pair. Communication may be initiated at a slower communication rate and then upgraded as appropriate for the two units. The present invention allows an efficient single circuit mechanism for communication units to transmit differential data and also to signal the use of a high speed communication rate with a common mode voltage. The present invention is especially useful within networks having units of varying versions and signal transfer rates.

28 Claims, 8 Drawing Sheets

$V_{TP} = R_T 4mA$

CIRCUIT AND METHOD FOR TWISTED PAIR CURRENT SOURCE DRIVER

BACKGROUND OF THE INVENTION

(1) Field of the Invention

The present invention relates to the field of data communications. More particularly the present invention relates to the field of efficient signal transmissions over high speed communication links.

(2) Prior Art

Small differential signals provide a number of advantages for the transmission of high bit rate data signals. A differential channel provides rejection of common mode noise (such as power supply noise) that may be present between a transmitting ("driving") and a receiving node. Differential signals can be transmitted on well known twisted-pair cables which are less expensive than coaxial or fiber optic cables and which when shielded, offer very good rejection of interferences from sources of external noise. Using small signal level differential signals over a shielded twisted-pair cable reduces EMI emissions, simplifies transmitter design, and reduces power dissipation.

One characteristic of a differential communication channel is that it reduces timing distortion due to mismatched rise and fall times and receiver threshold. Timing distortion must be minimized since in a digital communication system data is encoded in both time and amplitude. It is very difficult in a single-ended communication system to match the rise and fall times and this mismatch becomes significant when data rates become high (e.g., 50 Mbaud or more). Differential systems, however, do not suffer duty cycle distortion due to rise and fall time mismatch. Also, within a differential receiver, the threshold is not set externally as in a single-ended system. Instead, the threshold in a differential system is a function of the received signal and therefore tracks with the received signal corresponding to when the differential signal equals zero volts.

As such, it would be advantageous to provide high speed communication using a differential signal configuration. Further, it would be advantageous to provide two signal transmission techniques within a transmitter circuit as defined by the IEEE P1394 standard. The present invention provides for such advantageous functionality.

Communication units of a communication network often communicate at different speeds, depending on their internal configuration and/or depending on their maximum communication capacity. Different units adapted to and coupled to the communication network may communicate at different maximum communication rates. It would be advantageous to provide an efficient method and mechanism for one communication unit to signal its use of a high speed communication rate to another communication unit so that both may utilize a common and proper high speed communication rate. This is especially applicable to a communication network that provides for different communication rates among units of differing versions and complexity. The present invention offers such advantageous capability.

Accordingly, it is an object of the present invention to provide an efficient high speed data communication configuration. It is an object of the present invention to provide the high speed data communication configuration using a differential signal transmission technique that is compatible with the IEEE P1394 standard. It is further an object of the present invention to provide a transmission circuit and method for same that operates in both a differential signal transmission mode and, in addition, operates simultaneously in a common mode transmission mode. Using such a system, it is an object of the present invention to provide a communication unit with the ability to signal its use of a high speed communication rate to another communication unit while minimizing data communication delay. These and other objects not specifically mentioned above will become clear as described further below.

SUMMARY OF THE INVENTION

A mechanism and method for efficiently communicating information regarding particular communication rate ("speed signal") between communication stations (of a communication network). The transmitter operates on the IEEE P1394 High Performance Serial Bus standard to supply both differential and common mode signaling required by the IEEE standard for 100 and 200 Mbit transmission. However, the present invention speed signaling mechanism may be effectively used to signal the use of a variety of high speed communication rates in addition to the exemplary data rate disclosed herein. The present invention includes a transmission circuit that may operate in a differential signal mode and in a common mode signal mode simultaneously both utilizing a twisted pair cable. Data may be transmitted on the twisted pair at small differential signals. Information regarding the signal speed between two coupled units may be simultaneously transmitted using variations in the common mode voltage over the twisted pair. Communication may be initiated at a slower rate and then upgraded as appropriate for the two units. The present invention allows an efficient single circuit mechanism for communication units to transmit differential data and also to signal the use of a high speed communication rate with a common mode voltage. The present invention is especially useful within networks having units of varying versions and signal transfer rates.

More specifically, the embodiments of the present invention include a driver circuit for communicating information over a twisted pair cable, the driver circuit including: a first circuit for generating differential voltage signals over the twisted pair cable, the differential signals representative of digital data; and a second circuit for generating a common mode voltage signal over the twisted pair cable, the second circuit responsive to a speed signal input, and the common mode voltage signal for indicating a high speed information transmission rate. Embodiments of the present invention include the above and wherein the second circuit is also for generating differential voltage signals over the twisted pair cable simultaneously with the common mode voltage signal and wherein the first circuit is responsive to a set of inputs for generating high, low, and null differential voltage signals.

The present invention includes embodiments as described above and wherein the second circuit is responsive to a second set of inputs for generating the common mode voltage signal and also for generating high, low, and null differential voltage signals and wherein the first circuit comprises switchable current sources that are electrically connected to or disconnected from the twisted pair cable in response to the set of inputs and wherein the second circuit comprises switchable current sources that are electrically coupled to or isolated from the twisted pair cable in response to the second set of inputs.

DETAILED DESCRIPTION OF THE INVENTION

Figure 1:
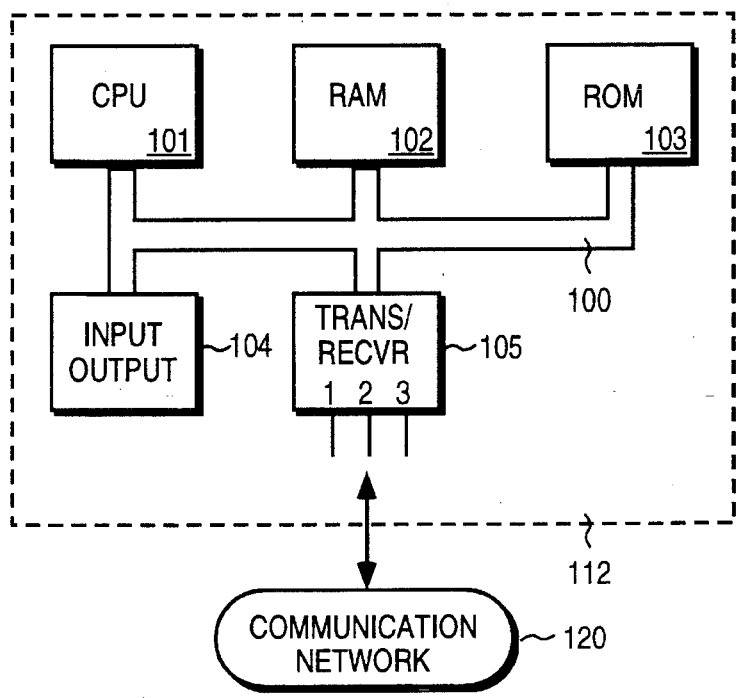
FIG. 1 illustrates a computer system of the present invention utilizing the transmitter of the present invention.

In the following detailed description of the present invention numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

The present invention includes a transmission circuit for transmitting data over a twisted pair cable using differential signals and simultaneously transmitting communication rate information ("speed signal") over the twisted pair cable using a common mode voltage variation. The present invention allows a communication unit to communicate or signal its use of a high speed communication rate ("speed signal") to another communication unit without requiring additional communication throughput because the common mode signal and the differential signal may be transmitted over the twisted pair cable simultaneously. This is very effective within high performance high speed communication networks. Within a given protocol of the present invention, the speed signal information is transmitted during an arbitration phase between the two coupled devices. However, the present invention driver is not limited to use with a particular communication protocol and other protocols may utilize speed signaling during other communication phases, such as during a packet data transmission phase.

The present invention operates within a communication network within which various units of varying capability and versions may be attached. Units may effectively communicate a speed signal using common mode arbitration (or data) variations while simultaneously communicating data using differential signals. The speed signal may be used in advance of communicating at a high data transfer rate depending on the particular communication protocol adopted by the network employing the present invention driver. The present invention driver employs a single circuit for transmitting the differential signals and for transmitting the common mode speed signal so that two separate transmitter circuits are not required. In this fashion, a single driver circuit may be utilized consistent with the IEEE P1394 standard.

In addition to the discussions herein regarding differential signal transmissions, a related copending application entitled CMOS Differential Twisted-Pair Driver, Ser. No. 08/100,662, filed Jul. 30, 1993, and assigned to the assignee of the present invention, describes circuitry for transmitting differential signals over a twisted pair cable but does not employ speed signaling using the common mode voltage. Another copending application entitled Method and Apparatus for a Dynamic, Multi-Speed Bus Architecture in which an Exchange of Speed Messages Occurs, Ser. No. 08/033,119, filed Mar. 18, 1993, and assigned to the assignee of the present invention, describes a communication protocol that can be effectively used by the present invention single circuit driver for utilizing the speed signaling of the present invention for communicating data transfer rate information among connected communication units. This may be used at initialization or during routine communication after system start up depending on the protocol adopted. The present invention is drawn to the circuitry and related method used by a communication unit for generating the speed signal and the differential signals on a single driver circuit and as such may be effectively utilized by a number of different communication protocols in addition to the above referenced protocol.

Refer to FIG. 1 which illustrates an exemplary computer system 112 that may be used in accordance with the present invention speed signaling circuitry. A central processor 101 is coupled to an address/data bus 100. The central processor 101 executes instructions stored in memory and processes data. A random access memory (RAM) 102 is coupled to the bus 100. The RAM 102 is for storing data and instructions. A read only memory (ROM) 103 is static memory storage and is also coupled to bus 100. An input/output device 104 is coupled to the address/data bus 100 for receiving and transmitting user information. The device 104 may include a keyboard, mouse, display unit, printer, modem, serial port, stylus and tablet, microphone, analog to digital converter, digital to analog converter, or other hardcopy or graphic display device.

Also coupled to the address/data bus 100 (or similarly coupled to receive system data) is a transmitter/receiver device 105 that contains the driver of the present invention and contains three pairs of twisted cable (illustrated as 1, 2, 3) as well as other linking circuitry. Device 105 contains link circuitry including a media access controller IC (MAC) which is a digital protocol IC for interfacing the driver of the present invention to bus 100. The MAC circuitry is not particularly pertinent to aspects of the present invention as developed herein. The transmitter/receiver device 105 allows the system 112 to transmit and receive information and high data transfer rates. For example, information may be processed by unit 105 at 100 Megabits, 200 Megabits or 400 Megabits per second. Up to three different cables of twisted pairs may be coupled to the transceiver 105 according to the present invention. A cable contains three twisted pairs, two for communication and one for power. However, it is appreciated that alternative embodiments of the present invention may utilize more than three ports or fewer than three ports as appropriate. The transceiver 105 is coupled to a communication network 120 that is composed of other devices (in addition to the computer system 112) and an exemplary network is described to follow. The computer system 112 may be implemented on a single chassis or within a single computer chip and as such is not limited to a desktop computer system. For instance, the computer system 112 may be implemented within a PDA or similar device.

Figure 2:
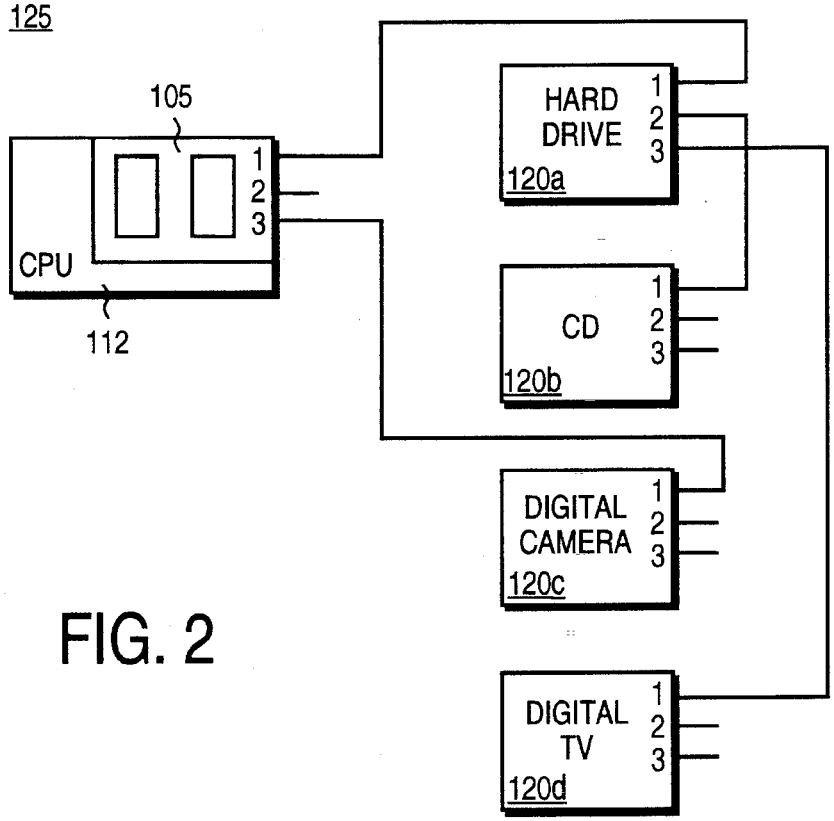
FIG. 2 illustrates an exemplary communication network of the present invention.

FIG. 2 illustrates the computer system 112 integrated within an exemplary communication network. It is appreciated that the overall system 125 may be implemented for processing digital audio and graphic information in real-time given the high speed data transmissions provided by the present invention transceiver 105. Given this, the system 125 may be implemented for supporting a number of multimedia applications, as well as other general purpose computing applications. Each device (120a–120d) of the network comprises three ports for coupling with other communication devices in a variety of methods and is not limited to a "daisy chain" configuration nor limited to a "star" configuration. Any device coupled to the network may communicate with any other device so coupled. It is appreciated that each device within the exemplary network contains a separate transceiver unit 105 as employed by the computer system 112. This transceiver unit of the present invention is discussed in further detail below. As shown, the exemplary network is composed of the computer system 112 coupled, via transceiver 105 to one twisted pair port (1) of a hard drive peripheral system 120a.

The second twisted pair port of the hard drive system 120a is coupled to one twisted pair port of a digital compact disc (CD) peripheral system 120b for audio information. A third twisted pair port of the hard drive system 120a is coupled to a first twisted pair port of a digital television peripheral system 120d for digital graphic display of information in real-time. Also coupled to the computer system 112 via a twisted pair cable is a digital camera system 120c for capturing digital graphic images in real-time and supplying same to the system 125. It is appreciated that a microphone unit may also be coupled to the system 125 for supplying digitized audio information. The above system 125 is exemplary only in that other devices not shown may be adapted to operate with the driver circuit of the present invention and other devices illustrated may be omitted. The devices illustrated within system 125 provide a platform for many multimedia applications and generally for the processing and manipulation of graphic and or audio information with a computer system environment. Using the communication network, devices may communicate information at exemplary rates of 100, 200 or 400 Megabits per second, depending on the capability of the attached device.

Figure 3:
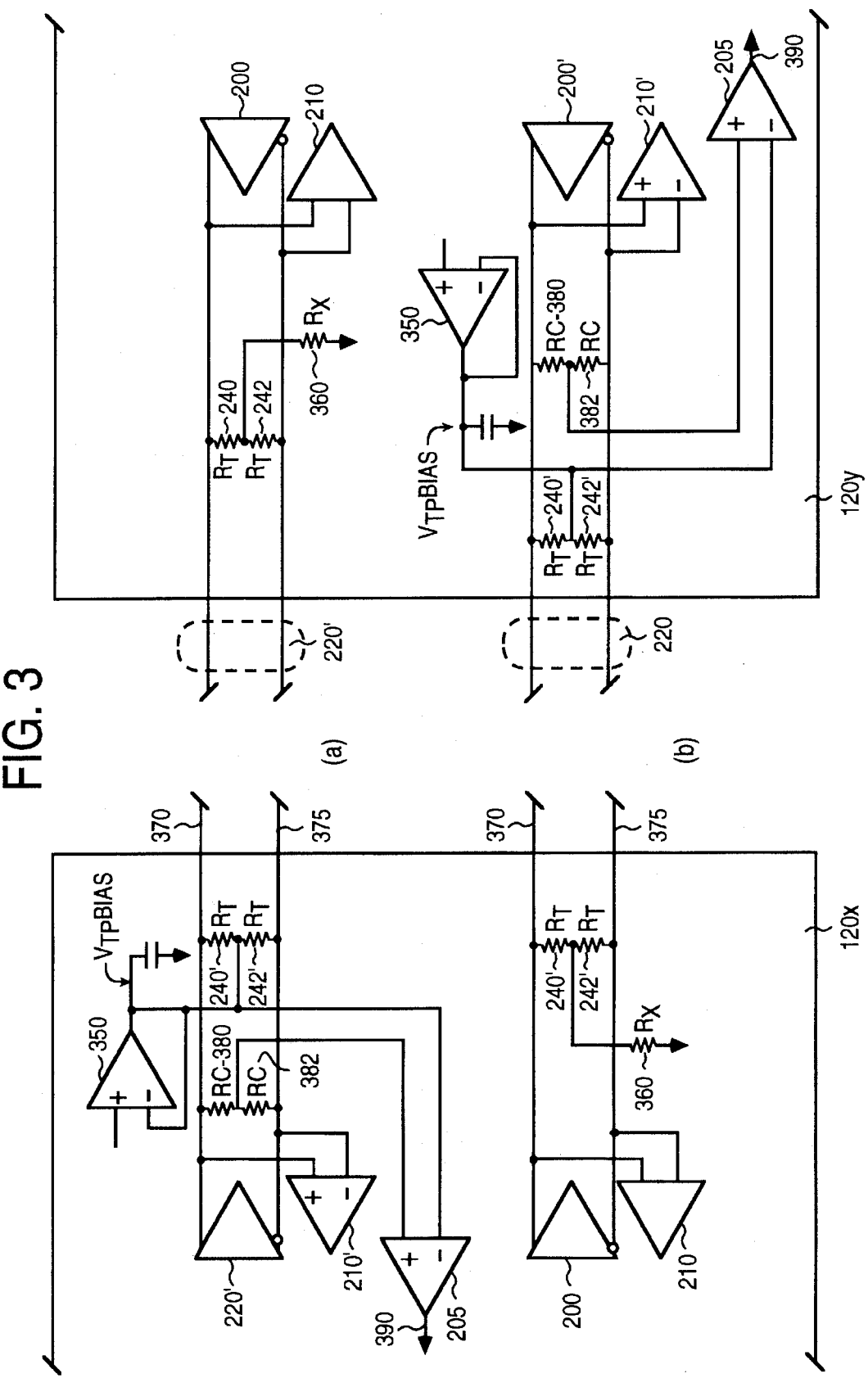
FIG. 3 is a circuit illustration of the circuitry of a typical port of the present invention illustrating the transmitter/receiver pair coupling with the twisted pair cables that comprise the port.

FIG. 3 illustrates the circuitry of a single port and two twisted pairs implemented with the driver circuit 200 of the present invention. A single port contains two twisted pairs 220' and 220 in the configuration as shown. As discussed above, each communication unit (e.g., device, peripheral, etc.) may contain a separate transceiver. In one embodiment, each transceiver of the present invention contains circuitry for communicating over three separate ports. FIG. 3 illustrates the circuitry for one port and two twisted pairs. However, it is appreciated that within the discussions hereinafter, the circuitry of FIG. 3 is replicated within each device to provide for communication handling over each separate port of the three possible ports of a given device.

A given port contains circuitry for transmitting a speed signal and circuitry for receiving the speed signal from a coupled device. FIG. 3 illustrates communication circuitry shown as (a) for coupling device 120x to device 120y using twisted pair cable 220' and also illustrates communication circuitry (b) for coupling device 120x to device 120y using twisted pair cable 220. Speed signal information is transmitted from device 120x and detected by device 120y using circuitry (b) and twisted pair cable 220. Speed signal information is transmitted from device 120y and detected by device 120x using circuitry (a) and twisted pair cable 220'. Port circuitry (a) and port circuitry (b) are mirror images of each other and therefore discussions of the present invention will focus on one circuit implementation (e.g., circuitry (b)). It is appreciated that discussions regarding circuitry (b) are equally applicable to circuitry (a).

As shown in FIG. 3, circuit (b), associated with one twisted pair cable of an exemplary network communication device 120x, there is a transmitter (driver) 200 of the present invention and a receiver 210. The transmitter 200 is coupled to a twisted pair cable 220 that is composed of a first wire 370 and a second wire 375. The cable 220, as shown in FIG. 3, is coupled to another exemplary communication device 120y. Device 120y similarly contains a receiver 210' and a transmitter 200' of the present invention. Transmitter 200' is of the present invention with speed signal mode disabled. Coupled across lines 370 and 375 are two terminating resistors (Rt) 240 and 242 associated with device 120x and also two other terminating resistors (Rt) 240' and 242' of device 120y. These resistors 240 and 242 are coupled in series across the twisted cable 220. A bias voltage VtpBias, is applied, as shown, by a voltage supply 350 between resistors 240' and 242' of device 120y. The bias voltage 350 is applied at one end of the communication link for a given port circuit. In one embodiment, the optimum bias voltage is 1.8 volts and the value of each terminating resistor is 55 ohms. However, it is appreciated that other voltage and resistor values may be utilized within the scope of the present invention.

Also coupled to one end of communication link (b) is a common mode voltage detection circuit 205 coupled in between two resistors (Rc) which are each 10 k ohms. The circuitry 205 also receives the bias voltage (VtpBias) as a reference. The receiver 210 (and 210') and transmitter 200 (and 200') of the present invention of each device are coupled in parallel to the twisted pair cable 220 as shown in FIG. 3. As is discussed in further detail below, the single circuit transmitters 200 and 200' of the present invention are capable of transmitting differential signals over cable 220 and also capable of transmitting common mode voltage signals over cable 220. Differential voltage signals are measured across lines 370 and 375.

In operation during arbitration, when device 120x is to transmit speed signal information to device 120y, then port circuitry (b) is utilized. This communication link is biased by the supply 350 of device 120y and the speed signal information is driven by driver 200 of the present invention located in device 120x. The common mode voltage variation resultant from the speed signal assertion is detected by detector 205 of device 120y. When device 120y is to transmit speed signal information to device 120x the reverse is true. Port circuitry (a) is utilized and this communication link is biased by the supply 350 of device 120x and the speed signal information is driven by driver 200 of the present invention located in device 120y. The common mode voltage variation resultant from the speed signal assertion is detected by detector 205 of device 120x.

Figure 4:
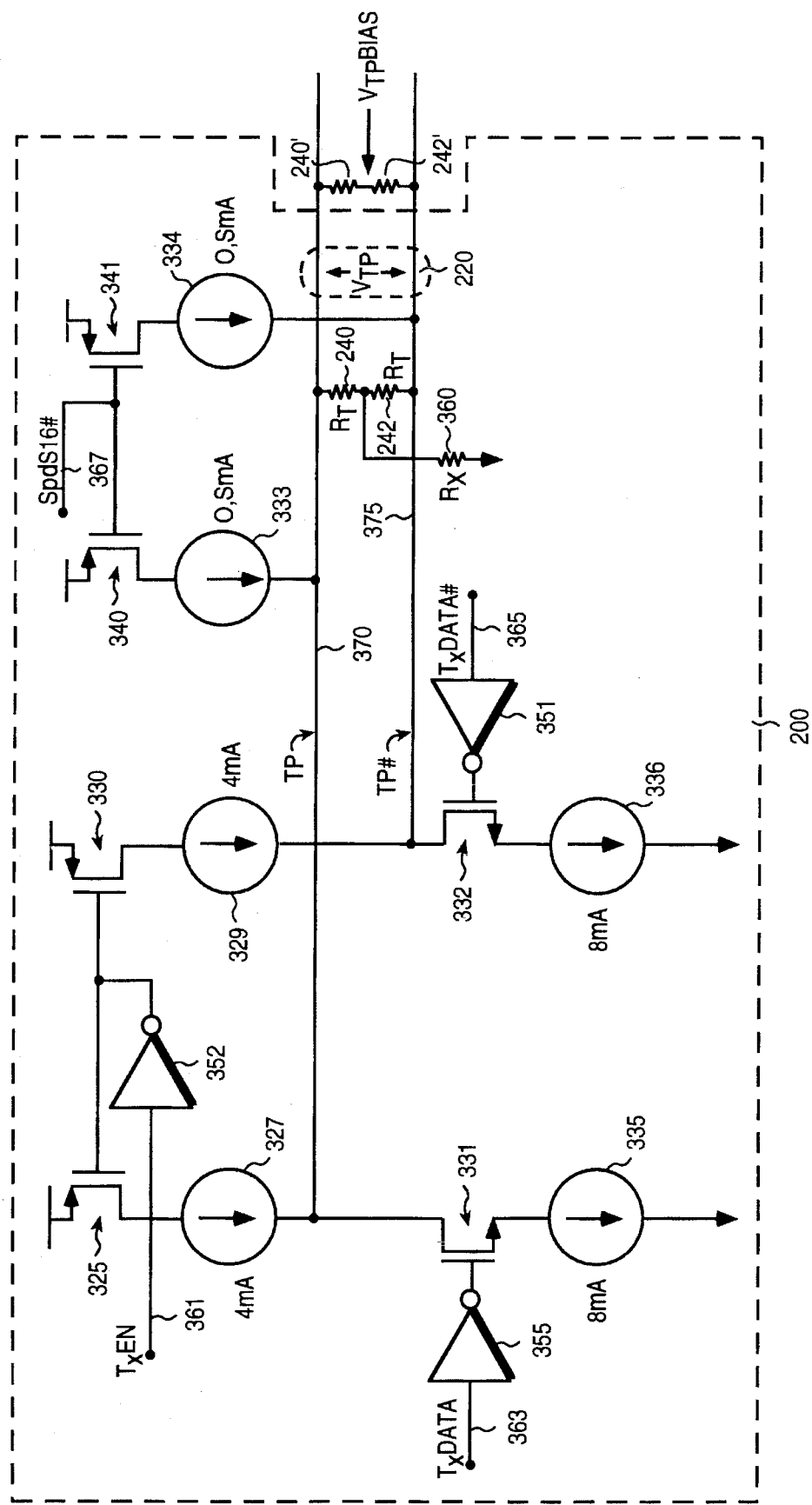
FIG. 4 is a circuit illustration of the single transmitter (driver) circuitry employed by the present invention for common mode and differential signal transmission.

FIG. 4 illustrates a single circuit transmitter 200 of the present invention (as implemented within a port circuitry (b) of device 120x) utilizing current sources to drive signals over cable 220. As shown, the transmitter is coupled to line 370 (TP) and line 375(TP#) which both comprise the twisted pair cable 220. Hereinafter and with respect to the drawings, the designation "#" means low asserted. The transmitter 200 is fabricated using digital CMOS technology and operates from 5.0 v to 3.3. v nominal power supply (e.g., Vcc). The pertinent input signals to transmitter 200 are transmit enable (TxEn), transmit data "1" bit (TxData), transmit data "0" bit (TxData#) and a speed signal indication (SpdSig#). The transmitter 200 outputs voltage signals over the twisted pair cable 220. Generally, the transmitter 200 of the present invention is capable of both differential signal transmission and also common mode signal transmission. Differential signal transmission is used for transmitting digital information and common mode signal transmission is used to convey the speed signal information (which may occur during communication arbitration). As described above, depending on the protocol adopted, the speed signal information may be used for indicating that the transmitter 200 is about to transmit at a high transmission rate, e.g., 200 Megabits per second.

During differential signal transmission, transmitter 200 is capable of sending a low voltage signal (indicative of a 0 data bit) or a high voltage signal (indicative of a 1 data bit) and also capable of transmitting a null voltage signal (Z) which is zero volts. Transmitter 200 is capable of transmitting in a common mode wherein the voltages over line 370 and 375 are both reduced by a predetermined amount, thus indicative of speed signal information. In an alternative embodiment, the speed signal common mode may increase the twisted pair common mode voltage.

Specifically, line 361 of FIG. 4 carries the transmit enable (TxEn) signal which is coupled to control p-type transistor 325 and p-type transistor 330. Both transistors are coupled to Vcc (power) as shown. When line 361 is high, both transistors are on and when line 361 is low, both transistors are off. Transistor 325 is coupled to a 4 mA current source 327 which is coupled to line 370. Line 370 is also coupled to an n-type transistor 331 which is coupled to an 8 mA current source 335 that is coupled to ground. The transmit data line 363 is coupled via an inverter 355 to control transistor 331. When line 363 goes high, transistor 331 is off. Transistor 330 is coupled to Vcc and coupled to a 4 mA current source 329 that is coupled to line 375 which is also coupled to n-type transistor 332. Transistor 332 is coupled to an 8 mA current source 336 which is coupled to ground as shown. Transistor 332 is controlled by inverter 351 which receives an input from line 365 (TxData#). When line 365 goes high, transistor 332 is off.

As shown in FIG. 4, p-type transistor 340 is coupled to Vcc and also coupled to a 0.5 mA current source 333 that is coupled to line 370. P-type transistor 341 is also coupled to Vcc and coupled to a 0.5 mA current source 334 which is coupled to line 375. Line 367 controls transistors 340 and 341 and when the speed signal# line 367 is low, both transistors are on. Terminating resistors Rt 240' and 242' are coupled in series across lines 370 and 375 (from device 120y) and in between the two resistors a bias voltage (VtpBias) of approximately 1.8 volts is applied from the voltage supply 350 of device 120y (see FIG. 4). When not operating in common mode, the bias voltage supply 350 does not supply significant common mode current onto line 370 or 375. It is appreciated that the appropriate transistors of driver 200 receiving inputs are used to electrically couple or decouple the appropriate current source from the cable 220. As such, the current sources are switchable on and off to form the resultant circuit.

In operation, the common mode (e.g., the speed signal mode) is not entered as long as line 367 is maintained high; when high, the different signal mode is utilized. In differential signal transmission mode, the transmitter 200 of the present invention asserts line 361 high (transmit enable) and TxData high over line 363 and TxData# low to transmit a "1." In this state, transistors 325 and 330 of driver 200 are on, transistors 340 and 341 are off and transistor 331 is off but transistor 332 is on. The transmitter 200 of the present invention asserts line 361 high (transmit enable) and TxData# high over line 365 and TxData is low over line 363 to transmit a "0." In this state, transistors 325 and 330 of driver 200 are on, transistors 340 and 341 are off, transistor 331 is on but transistor 332 is off. To transmit a null (e.g., zero) voltage (Z signal), the present invention transmitter 200 asserts line 361 low (transmit enable) and asserts line 363 and line 365 high. Transistors 325 and 330 are off, transistors 340 and 341 are off, transistors 331 and 332 are off. In this mode, no voltage is transmitted over the twisted pair cable 220. Therefore, during transmission of a Z signal no power is utilized by the present invention as no current flows across cable 220.

In order for the present invention transmitter 200 to enter the speed signal mode ("common mode"), line 367 is brought low. In common mode, in order to transmit a 0 or 1 signal, the inputs are asserted similar to the assertions as described above, but line 367 is maintained low and line 361 is low. In operation, the common mode is utilized as long as line 367 is maintained low. In speed signal transmission mode, the transmitter 200 of the present invention asserts line 361 low and TxData high over line 363 and TxData# low to transmit a "1." In this mode transistors 325 and 330 are off, transistors 340 and 341 are on and transistor 331 is off but transistor 332 is on. The transmitter 200 of the present invention asserts line 361 low and TxData# high over line 365 and TxData low over line 363 to transmit a "0." In this state, transistors 325 and 330 are off, transistors 340 and 341 are on, transistor 331 is on but transistor 332 is off. To transmit a null voltage (Z signal) during common mode, the present invention transmitter asserts line 361 high and asserts line 363 and line 365 low. Transistors 325 and 330 are on, transistors 340 and 341 are on, transistors 331 and 332 are on and the differential voltage is zero. In this mode, no differential voltage is transmitted over the twisted pair cable 220. Table I below illustrates the input and output signals realized by the present invention transmitter 200 for transmitting in differential mode only and in speed signal mode with both common mode and differential output.

TABLE I

| Mode | Input | Diff Output |
| --- | --- | --- |
| Diff Signal | TxEn=1, TxData=1, TxData#=0 SpdSig#=0 | 1 |
| Diff Signal | TxEn=1, TxData=0, TxData#=1 SpdSig#=0 | 0 |
| Diff Signal | TxEn=0, TxData=1, TxData#=1 SpdSig#=0 | Z |
| Commn Mode | TxEn=0, TxData=1, TxData#=0 SpdSig#=1 | 1 |

TABLE I-continued

| Mode | Input | Diff Output |
|---|---|---|
| Commn Mode | TxEn=0, TxData=0, TxData#=1 SpdSig#=1 | 0 |
| Commn Mode | TxEn=1, TxData=0, TxData#=0 SpdSig#=1 | Z |

The driver (transmitter) 200 outputs negative common mode voltage glitch whenever the driver changes from the Z state to either high or low. Fortunately, the driver transitions possible while the transceiver 105 is trying to detect a common mode speed signal are: (1) from Z to Z; or (2) from 1 to Z so that the voltage glitch cannot be mistaken as a transmitted speed signal.

Figure 5:
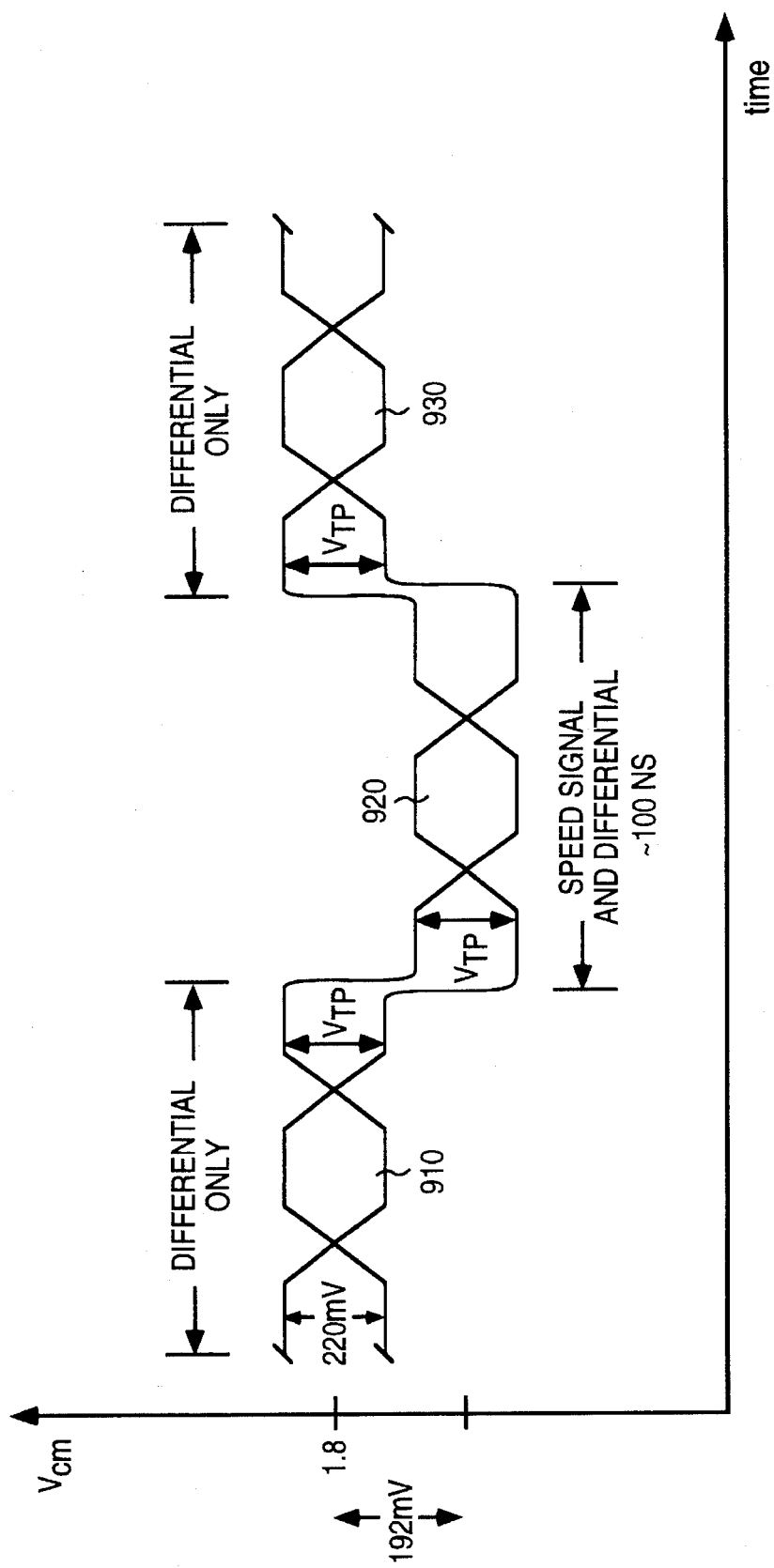
FIG. 5 is a timing diagram illustrating the differential mode transmission and the common mode speed signaling of the present invention.

FIG. 5 is a timing diagram illustrating the effect of the differential and common mode voltage transmissions of the present invention transmitter 200 over the twisted pair cable 220. Voltage is across the vertical and time is across the horizontal. Segment 910 illustrates the differential voltage (Vtp) when in differential transmission mode only. Segment 920 illustrates the wave forms over the twisted pair cable 220 when the present invention enters the common mode to relay the speed signal information. As shown, the common mode voltage over the twisted pair 220 is reduced by a predetermined amount as compared to segment 910. However, in an alternate embodiment, it may be increased. During segment 920, the transmitter is relaying speed signal information and line 367 (FIG. 4) is low. At the start of segment 930, the speed signal is removed and the voltage of the twisted pair cable 220 returns to the levels of segment 910, as shown. A receiver unit 205 may monitor the common mode voltage across cable 220 and will be able to detect the speed signal by the common mode voltage variations between segment 910, segment 920 and segment 930. The speed signal information may be used to set up both transmitter 200 and receiver 210 to process information at a high data transfer rate, e.g., 100 or 200 Megabits per second. It is appreciated that the specific high data transfer rate may be arbitrarily determined as the speed signal of the present invention may be used to indicate a variety of speed settings.

Devices configured to transmit and receive information at 200 Megabits per second can also transmit and receive information at 100 Megabits using the present invention. Therefore a device implemented with the present invention driver circuit may be referred to as a 200/100 Megabit device. Similarly, a device configured to transmit at 400 Megabits may also transmit at 200 or 100 Megabits per second.

Figure 6A:
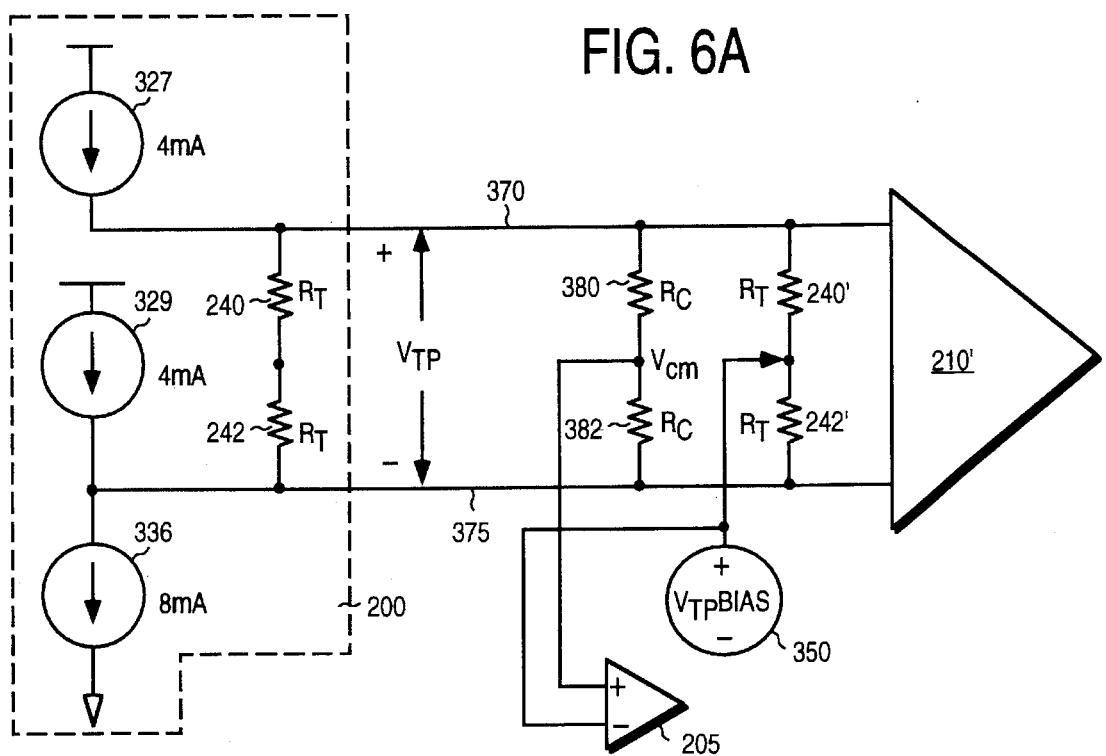
FIG. 6A illustrates a resultant circuit of the present invention for transmission of a "1" in differential mode only.
Figure 6B:
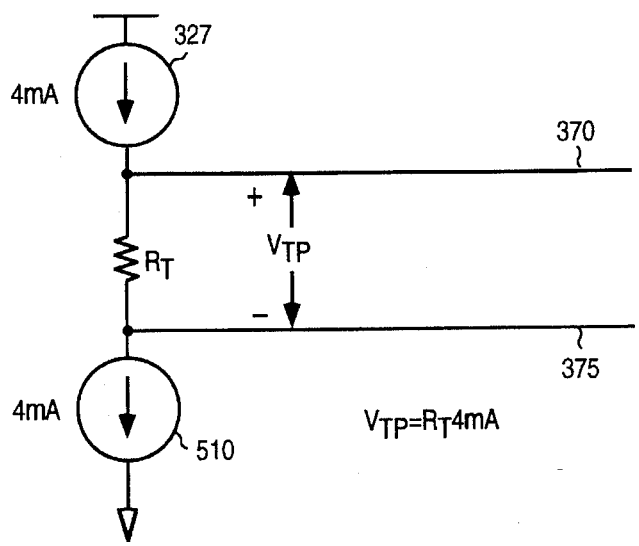
FIG. 6B illustrates a further resultant circuit of the present invention single circuit driver for transmission of a "1" in differential mode only.

Refer to FIG. 6A and FIG. 6B. FIG. 6A illustrates a resultant circuit of the driver 200 of FIG. 4 when the speed signal (line 367) of the present invention is high (e.g., not asserted) and when a "1" is to be transmitted from transmitter 200 in differential mode only. Transistors that are off isolate certain portions of the circuit 200. Unit 350 as well as Rc resistors 380 and 382 (of device 120y), as discussed, are provided for measuring the common mode voltage on twisted pair cable 220. Both the transmitter 200 and receiver 210' provide a series connection of terminating resistors 240 and 242 and also 240' and 242'. A bias voltage (VtpBias) is applied to the middle of series resistors 240' and 242' by voltage supply 350 of device 120y. According to the resultant circuit, a 4 mA current source 327 is coupled from Vcc to line 370, a 4 mA current source 329 is coupled from Vcc to line 375 and an 8 mA current source 336 is coupled from line 375 to ground. Electrically, FIG. 6B illustrates a further resultant circuit and as shown, Vtp, the differential voltage across lines 370 and 375, is the current (4 mA) times the resistance (Rt). Assuming, in one embodiment, the Rt value is 55 ohms, the differential voltage Vtp when the present invention transmits a "1" is 220 mV. It is appreciated that in differential mode only, the bias voltage (VtpBias) supply 350 does not supply significant current to the driver circuit of 6A.

Figure 7A:
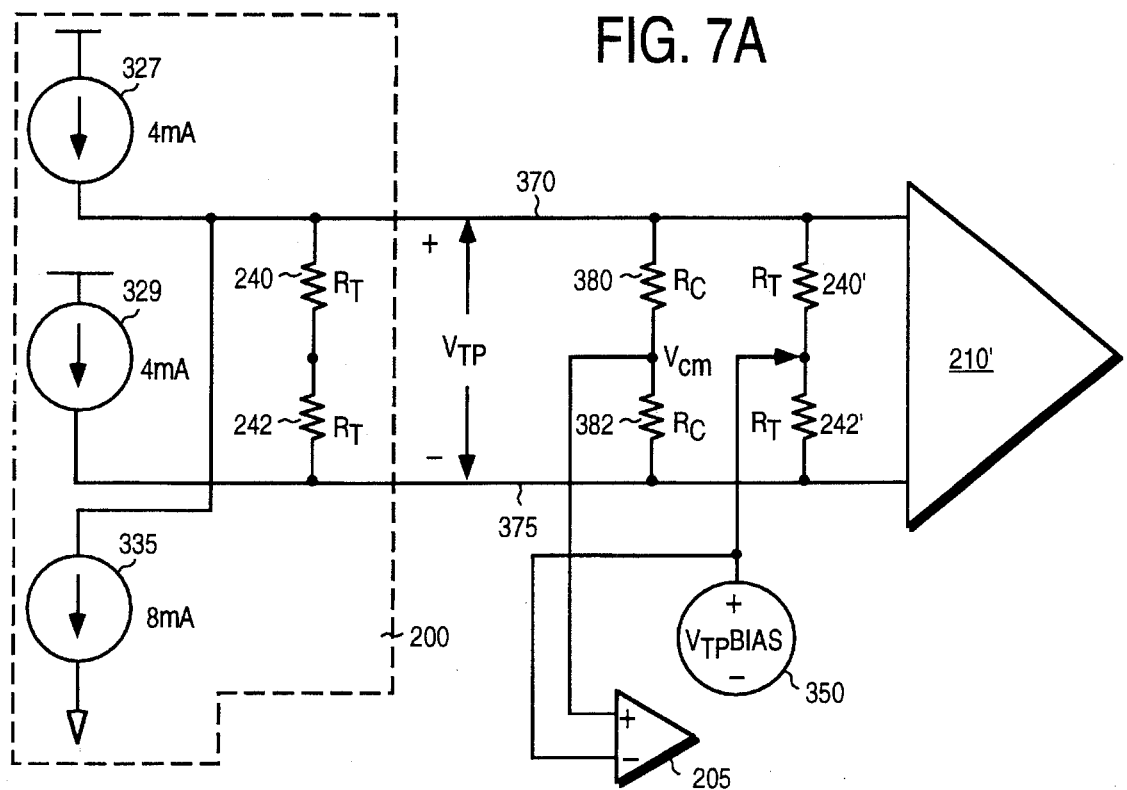
FIG. 7A illustrates a resultant circuit of the present invention single circuit driver for transmission of a "0" in differential mode only.
Figure 7B:
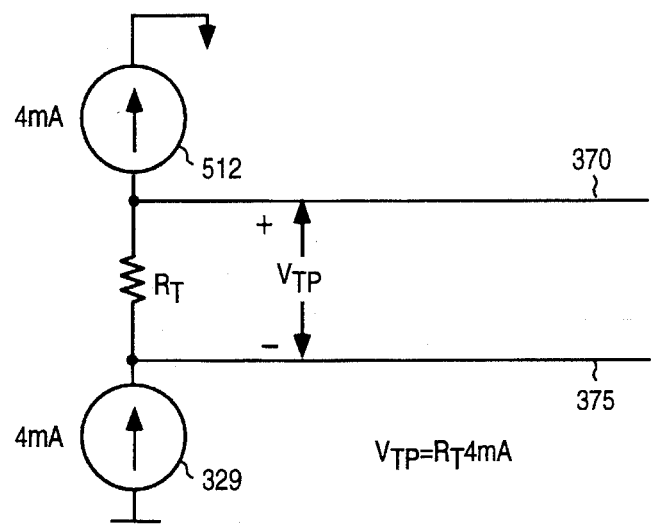
FIG. 7B illustrates a further resultant circuit of the present invention single circuit driver for transmission of a "0" in differential mode only.

Refer to FIG. 7A and FIG. 7B. FIG. 7A illustrates a resultant circuit of the driver 200 of FIG. 4 when the speed signal (line 367) of the present invention is high (e.g., not asserted) and when a "0" is to be transmitted from transmitter 200 in differential mode only. Transistors that are off isolate certain portions of the circuit 200. Unit 205 as well as Rc resistors 380 and 382 (of device 120y) are provided for measuring the common mode voltage on twisted pair cable 220. Both the transmitter 200 and receiver 210' provide a series connection of terminating resistors 240 and 242 and also 240' and 242'. A bias voltage (Vtp Bias) is applied to the middle of series resistors 240' and 242' by voltage supply 350 of device 120y. A 4 mA current source 327 is coupled from Vcc to line 370, a 4 mA current source 329 is coupled from Vcc to line 375 and an 8 mA current source 335 is coupled from line 370 to ground. Electrically, FIG. 7B illustrates a further resultant circuit and as shown, Vtp, the differential voltage across lines 370 and 375, is the current (−4 mA) times the resistance (Rt). Assuming, in one embodiment, the Rt value is 55 ohms, the differential voltage Vtp when the present invention transmits a "0" is −220 mV. It is appreciated that in differential mode only, the bias voltage (VtpBias) does not supply significant current to the driver circuit of FIG. 7A.

It is appreciated that during differential signal mode while the speed signal line 367 is not asserted, when transmitting a Z signal, no current flows through cable 220 and no differential voltage is present since no voltage flows through the terminating resistors 240 and 242 of driver 200.

Figure 8:
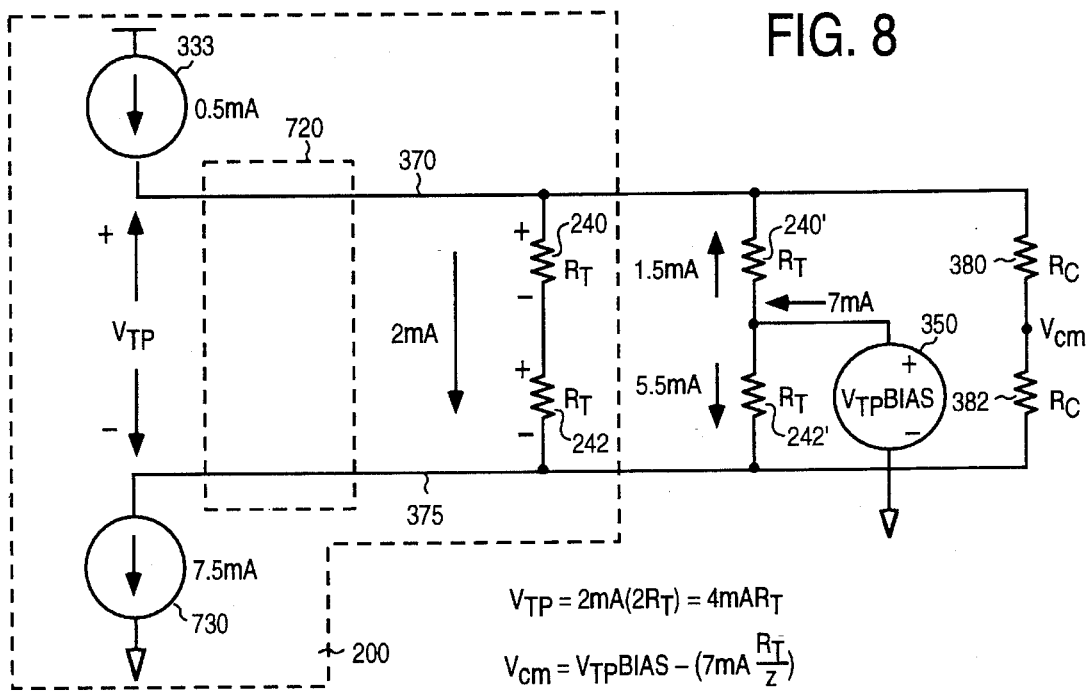
FIG. 8 is an illustration of a resultant circuit of the present invention single circuit driver for transmission of a "1" in common mode (speed signal).

FIG. 8 illustrates the resultant circuit of the driver circuit 200 of FIG. 4 when in common mode and a "1" is to be signaled. In common mode, the speed signal# (line 367)is brought low, e.g., asserted. In common mode speed signaling, the bias voltage (VtpBias) supplies current into the circuit as shown in FIG. 8. In this mode, the 0.5 mA current source 333 is coupled from Vcc to line 370. An equivalent current source 730 of 7.5 mA is coupled from line 375 to ground. Solving current equations in the well known manner, the current between each node may be determined. These currents are illustrated in FIG. 8. In this configuration, the bias voltage supply 350 of device 120y supplies 7 mA of current and 2 mA of current flow through the series connection of terminating resistors 240 and 242 of driver 200. Therefore, while transmitting a "1" in common mode, the differential voltage (Vtp) of the present invention driver is 2 mA multiplied by (2Rt) or 220 mV. However, less current (e.g., 7.5 mA as opposed to 8.0 mA) is sunk to ground in speed signal mode and therefore the common mode voltage is decreased by 192 mV as compared to differential mode only. This is shown in FIG. 5, e.g., between segments 910 and 920.

The common mode voltage (Vcm) may be measured between series resistors 380 and 382 of device 120y. A 10 k resistor (Rc) 380 and a 10 k resistor (Rc) 382 are coupled in series across lines 370 and 375 and the voltage between (Vcm) is measured. The receiver 210' of device 120y may utilize such a circuit, along with comparator 205, to detect the speed signal. It is appreciated that the common mode signal may also be detected and discussed in terms of a common mode current flow over the cable 220 regarding an alternate embodiment of the present invention.

Figure 9:
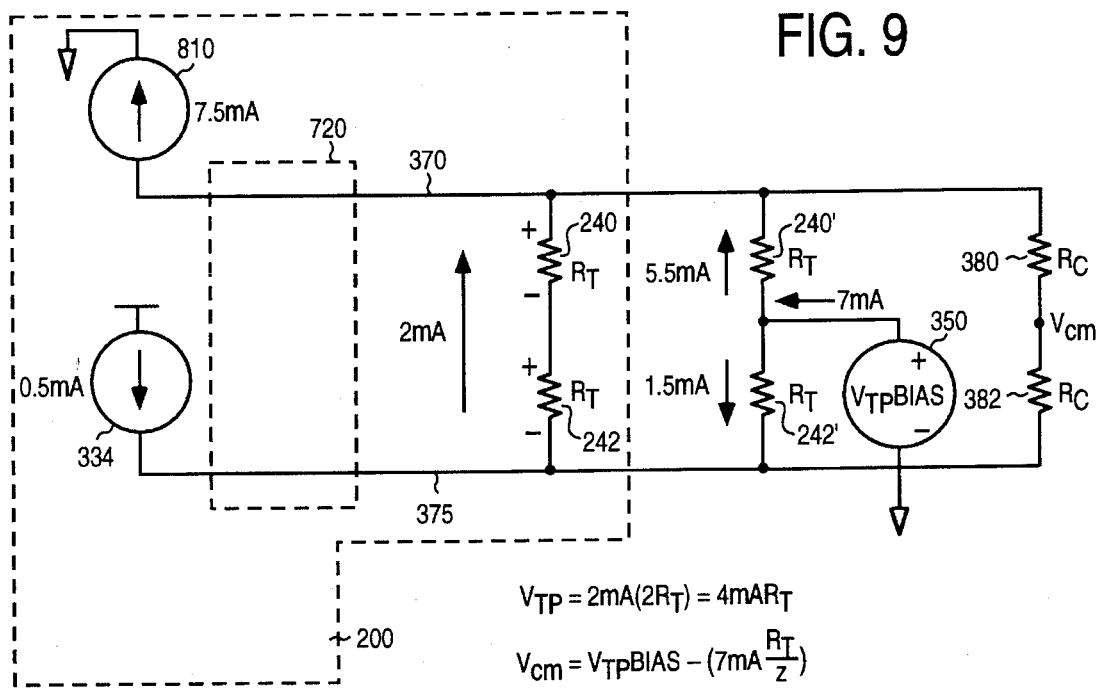
FIG. 9 is an illustration of a resultant circuit of the present invention single circuit driver for transmission of a "0" in common mode (speed signal).

FIG. 9 illustrates the resultant circuit of the driver circuit 200 of FIG. 4 when in common mode and a "0" is to be signaled. In common mode, the speed signal# (line 367) is brought low, e.g., asserted. In common mode speed signaling, the bias voltage (VtpBias) supplies current into the circuit as shown in FIG. 9. The 0.5 mA current source 334 is coupled from line 375 to Vcc. An equivalent current source 810 of 7.5 mA is coupled from line 370 to ground. Solving current equations in the well known manner, the current between each node may be determined are illustrated in FIG. 9. In this configuration, the bias voltage supply 350 of device 120y supplies 7 mA of current and 2 mA of current flow through the series connection of terminating resistors 240 and 242 of driver 200 in the direction indicated. Therefore, while transmitting a "0" in common mode, the differential voltage (Vtp) is −2 mA multiplied by (2Rt) or −220 mV. However, in speed signaling less current (e.g., 7.5 mA as opposed to 8.0 mA) flows ground and therefore the common mode voltage is decreased by 192 mV and common mode current flows through cable 220.

During speed signaling, to transmit a Z signal, Table I illustrates the inputs utilized by the driver 200 and according to well known circuit equations, the driver 200 of the present invention will not generate a differential voltage across lines 370 and 375 but the common mode voltage will decrease as shown in FIG. 5. The bias voltage supply 350 will supply current in this configuration.

It is appreciated that throughout the discussion herein, the reference ground between the two devices may have a different potential voltage.

Figure 10:
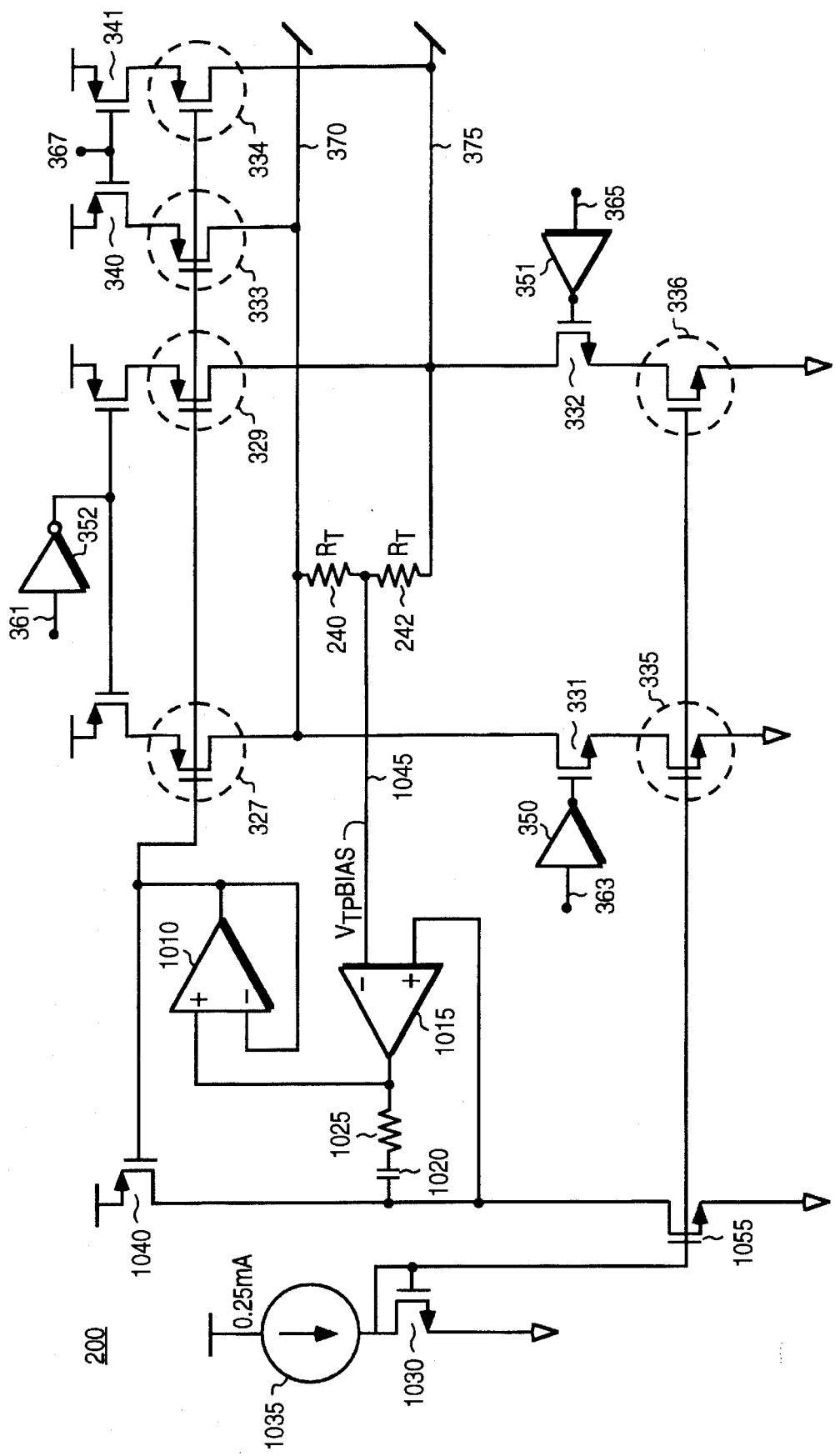
FIG. 10 is an illustration of the common mode early voltage correction (compensation) subcircuit used by the present invention driver circuit.

The present invention driver may utilize a subcircuit as shown in FIG. 10 for compensating the driver 200 of the present invention when communication devices having different ground node voltages are coupled together. The subcircuit of FIG. 10 prevents this situation from causing improper speed signal information from being detected by increasing the common mode effectively early voltage characteristic of the driver 200 and preventing unwanted common mode current flow into or out of the twisted pair cable 220.

The subcircuit illustrated in FIG. 10 is coupled with the other components of the driver 200 as discussed previously with reference to FIG. 4. Driver 200 as shown in FIG. 10 is the driver of device 120x of circuit (b) as shown in FIG. 4. The current drivers are illustrated in FIG. 10 in transistor form and comprise, as shown, small channel length p-channel transistors. Transistors 335 and 336 are n-type transistors. The structure of the subcircuit of the present invention is now discussed and comprises amplifiers 1010 and 1015 as well as resistor 1025 and capacitor 1020. Also, p-type transistor 1040 and n-type transistor 1055. A 0.25 mA current source 1035 is coupled to Vcc (power) and coupled to n-type transistor 1030 which is coupled to ground. The gate of transistor 1030 is coupled to the gate of transistor 1055, transistor 335, and transistor 336 and also coupled to current source 1035.

The inverted input of amplifier 1015 is coupled to the node between resistors 240 and 242 at node 1045. Here the bias voltage received by the driver 200 is monitored. The bias voltage is generated by the voltage supply 350 of device 120y (as VtpBias). However, for a variety of reasons, as discussed above, the bias voltage may vary as perceived by the driver circuit 200 of device 120x. The positive input of amplifier 1015 is a feedback loop and is coupled to one node of capacitor 1020 which is coupled to resistor 1025 which is coupled to the output of amplifier 1015. This is a feedback arrangement. As shown, the node coupled to the positive input of amplifier 1015 will mirror the voltage signal on node 1045 (the common mode voltage). The output of amplifier 1015 is coupled to the positive input of amplifier 1010. The negative input of amplifier 1010 is coupled to the output of amplifier 1010 in a voltage follower feedback arrangement. The output of amplifier 1010 is coupled to the gate of current sources 327, 329,333, and 334 and also coupled to the gate of transistor 1040. It is appreciated that the gates of transistors 327, 329,333, and 334 are coupled together as shown in FIG. 10. These gates are effected by the signal from the output node of amplifier 1010.

Transistor 1040 is coupled to Vcc and also coupled to one node of capacitor 1020. The gate of transistor 1055 is coupled to the gate of transistor 1030 and also coupled to the gates of transistors 335 and 336 (e.g., the 8 mA n-type current sources). The drain of transistor 1055 is coupled to the positive input node of amplifier 1015 as is the drain of transistor 1040. The capacitor 1020 and resistor 1025 are used for compensation of the feedback loop of the present invention. The twisted pair cable lines 370 and 375 of FIG. 10 coupled with the receiver 210' (not shown in FIG. 10) of another device. The VtpBias circuit 350 of the other device is generating the bias voltage that is sampled or monitored at 1045 by the present invention subcircuit.

In operation, the subcircuit of the present invention provides a feedback mechanism that, in effect, forces the current in transistor drivers (327, 329,333, and 334) to track the change in current in 335 and 336 as the common input voltage varies and therefore increases the common mode early voltage characteristic of the driver 200 in response to a common mode (bias) voltage that is higher (or lower) than expected. The common mode (bias) voltage is monitored at node 1045.

Note that the n channel transistors 335 and 336 do increase (or decrease) in current as the common mode input voltage received at 1045 goes higher (or lower). However, the increase (or decrease) of the p channel transistors' current caused by the feedback subcircuit of the present invention tracks the n channel transistors' current change and results in no net common mode output current (source or sink). As a result, the driver's common mode output impedance is effectively increased by the feedback subcircuit.

Therefore, as shown, the present invention driver circuit 200 utilizes current sources within a single circuit configuration to both generate differential voltage signals and also generate common mode voltage (or current) variations for speed signaling. This driver 200 is used to drive a twisted pair cable. The driver 200 may be used in a variety of communication protocols to signal communication rate variations between communicating devices of a network. The single circuit driver 200 of the present invention is ideally suited for the IEEE P1394 communication standard.

The preferred embodiment of the present invention, a single circuit driver for generating both differential signaling and common mode signaling (speed signaling), is thus described. While the present invention has been described in particular embodiments, it should be appreciated that the present invention should not be construed as limited by such embodiments, but rather construed according to the below claims.

What is claimed is:

1. A driver circuit comprising:
   a first arrangement for generating differential signals over a twisted pair cable, said differential signals representative of binary information, said first arrangement responsive to a data input; and a second arrangement for generating a common mode signal over said twisted pair cable, said second arrangement responsive to a speed signal input, wherein said first arrangement and said second arrangement are implemented within a single driver circuit;

wherein said second arrangement is also for generating differential signals over said twisted pair cable simultaneously with said common mode signal.

2. A driver circuit as described in claim 1 wherein said common mode signal is for conveying information regarding a high speed communication rate.

3. A driver circuit as described in claim 2 wherein said first arrangement comprises:

a first transistor coupled to power and coupled to a first current source that is coupled to a first line of said twisted pair cable;

a second transistor coupled to power and coupled to a second current source that is coupled to a second line of said twisted pair cable;

a third transistor coupled to said first line and coupled to a third current source that is coupled to ground; and a fourth transistor coupled to said second line and coupled to a fourth current source that is coupled to ground.

4. A driver circuit as described in claim 3 further comprising:

an enable input coupled to control said first transistor and said second transistor; and wherein said data input comprises: a data high transmit input coupled to control said third transistor; and a data low transmit input coupled to control said fourth transistor.

5. A driver circuit as described in claim 4 wherein said second arrangement comprises:

a fifth transistor coupled to power and coupled to a fifth current source that is coupled to said first line; and a sixth transistor coupled to power and coupled to a sixth current source that is coupled to said second line; and wherein said speed signal input is coupled to control said fifth transistor and said sixth transistor.

6. A driver circuit as described in claim 5 wherein said third and fourth current sources output more current than said first and second current sources and wherein said first and second current sources output more current than said fifth and sixth current sources.

7. A driver circuit as described in claim 1 wherein said first arrangement is responsive to a first set of inputs for generating a high, low and null differential voltage signal over said twisted pair cable and wherein said null voltage signal consumes no current.

8. An apparatus for driving a twisted pair cable, said apparatus comprising:

differential driving means for generating differential signals over a twisted pair cable, said differential signals representative of binary information, said differential driving means responsive to a data input; and common mode driving means for generating a common mode signal over said twisted pair cable, said common mode driving means responsive to a speed signal input, and wherein said differential driving means and said common mode driving means are implemented within a single driver circuit;

wherein said common mode driving means is also for generating differential signals over said twisted pair cable simultaneously with said common mode signal.

9. An apparatus as described in claim 8 wherein said common mode signal is for conveying information regarding a high speed communication rate.

10. An apparatus as described in claim 9 wherein said differential driving means comprises:

a first transistor coupled to power and coupled to a first current source means that is coupled to a first line of said twisted pair cable;

a second transistor coupled to power and coupled to a second current source means that is coupled to a second line of said twisted pair cable;

a third transistor coupled to said first line and coupled to a third current source means that is coupled to ground; and a fourth transistor coupled to said second line and coupled to a fourth current source means that is coupled to ground.

11. An apparatus as described in claim 10 further comprising:

an enable input coupled to control said first transistor and said second transistor; and wherein said data input comprises: a data high transmit input coupled to control said third transistor; and a data low transmit input coupled to control said fourth transistor.

12. An apparatus as described in claim 11 wherein said common mode driving means comprises:

a fifth transistor coupled to power and coupled to a fifth current source means that is coupled to said first line; and a sixth transistor coupled to power and coupled to a sixth current source means that is coupled to said second line; and wherein said speed signal input is coupled to control said fifth transistor and said sixth transistor.

13. In an electronic device, a driver circuit for communicating information over a twisted pair cable, said driver circuit comprising:

first circuitry for generating differential voltage signals over said twisted pair cable, said differential signals representative of binary data; and second circuitry for generating a common mode voltage signal over said twisted pair cable, said second circuitry responsive to a speed signal input, and said common mode voltage signal for indicating a high speed transmission rate;

wherein said second circuitry is also for generating differential voltage signals over said twisted pair cable simultaneously with said common mode voltage signal.

14. A driver circuit as described in claim 13 wherein said first circuitry is responsive to a set of inputs for generating high, low, and null differential voltage signals wherein said null differential voltage signal consumes no current.

15. A driver circuit as described in claim 13 wherein said second circuitry is responsive to a set of inputs for generating said common mode voltage signal and also for generating high, low, and null differential voltage signals.

16. A driver circuit as described in claim 14 wherein said first circuitry comprises switchable current sources that are electrically coupled to or decoupled from said twisted pair cable in response to said set of inputs.

17. A driver circuit as described in claim 15 wherein said second circuitry comprises switchable current sources that are electrically coupled to or decoupled from said twisted pair cable in response to said set of inputs.

18. A driver circuit as described in claim 13 wherein said first circuitry and said second circuitry are implemented in CMOS technology on a single driver circuit.

19. A communication network comprising:

a plurality of communicating devices comprising a general purpose computer system; a digital graphic display device, a digital graphic input device, and a digital information storage device; and associated with individual devices of said network, a driver circuit for communicating information over a twisted pair cable, said driver circuit comprising:

first circuitry for generating differential voltage signals over said twisted pair cable, said differential signals representative of digital data; and second circuitry for generating a common mode voltage signal over said twisted pair cable, said second circuitry responsive to a speed signal input, and said common mode voltage signal for indicating a high speed transmission rate;

wherein said second circuitry is also for generating differential voltage signals over said twisted pair cable simultaneously with said common mode voltage signal.

20. A communication network as described in claim 19 wherein said first circuitry is responsive to a set of inputs for generating high, low, and null differential voltage signals.

21. A communication network as described in claim 19 wherein said second circuitry is responsive to a set of inputs for generating said common mode voltage signal and also for generating high, low, and null differential voltage signals.

22. A communication network as described in claim 20 wherein said first circuitry comprises switchable current sources that are electrically coupled to or decoupled from said twisted pair cable in response to said set of inputs.

23. A communication network as described in claim 21 wherein said second circuitry comprises switchable current sources that are electrically coupled to or decoupled from said twisted pair cable in response to said set of inputs.

24. In a communication device, a method of communicating information over a twisted pair cable, said method comprising the steps of:

generating differential voltage signals over said twisted pair cable, said differential voltage signals representative of digital information for transmission, said step of generating differential voltage signals performed by a single driver circuit; and generating common mode voltage signal over said twisted pair cable, said common mode voltage signal for signaling communication speed information, said step of generating common mode voltage signal also performed by said single driver circuit;

wherein said step of generating differential voltage signals and said step of generating common mode voltage signal may be performed simultaneously over said twisted pair cable.

25. A method of communicating information as described in claim 24 further comprising the step of receiving a set of digital signal inputs for generating high, low and null differential voltage signals and wherein said step of generating differential voltage signals is responsive to said set of digital signal inputs.

26. A method of communicating information as described in claim 24 further comprising the step of receiving a set of digital signal inputs for generating said common mode voltage signal and also for generating high, low, and null differential voltage signals and wherein said step of generating said common mode voltage signal is responsive to said set of digital signal inputs.

27. A method of communicating information as described in claim 25 wherein said step of generating differential voltage signals utilizes switchable current sources that are electrically coupled to or decoupled from said twisted pair cable in response to said set of digital signal inputs.

28. A method of communicating information as described in claim 26 wherein said step of generating common mode voltage signal utilizes switchable current sources that are electrically coupled to or decoupled from said twisted pair cable in response to said set of digital signal inputs.

* * * * *